UNITED STATES PATENT OFFICE.

HENRY SPENCER BLACKMORE, OF MOUNT VERNON, NEW YORK.

FORMALDEHYDE PRODUCT AND PROCESS OF MAKING SAME.

No. 795,757.      Specification of Letters Patent.      Patented July 25, 1905.

Application filed September 7, 1904. Serial No. 223,626.

*To all whom it may concern:*

Be it known that I, HENRY SPENCER BLACKMORE, a citizen of the United States, residing at Mount Vernon, in the county of Westchester and State of New York, have invented certain new and useful Improvements in a new Composition of Formic Aldehyde and its Polymerids, of which the following is a specification.

This invention relates to a new article of manufacture for disinfecting, germicide, antiseptic, toilet, and medicinal purposes and process of making the same; and it consists of a compound or composition of solid nature preferably combining absorbent and lubricant or emollient properties, containing formic aldehyde or its polymerids, which compound or composition may or may not be associated with aromatic substances capable of masking the pungent odor of the formic aldehyde, the object being to produce a solid composition containing formic aldehyde or its polymerids which may be employed as an antiseptic toilet article for the purpose of absorbing perspiration, destroying the disagreeable odor-producing principle thereof, and effectually acting as an antifriction substance or lubricant to prevent chafing, and also capable of being employed for disinfectant and germicide purposes by exposing the substance in such a manner that the formic-aldehyde content thereof may be discharged therefrom.

As a specific illustration of my new composition of matter and the manner in which the same is produced I will take, for example, the production of talcum containing formic aldehyde, which talcum naturally consists largely of magnesium silicate, the antifriction, antichafing, and lubricant or emollient properties of which are well known.

The manner in which I prefer to produce the talcum containing formic aldehye is to mix the talcum with a portion of paraformaldehyde or trioxymethylene in proportion of one part of paraformaldehyde to ten thousand parts of powdered talcum and place the same in a container capable of being subjected to the action of heat, so that the proportion of formic aldehyde will be sufficient to act as an antiseptic, but not sufficient to injuriously affect the cuticle, and exhausting the air therefrom and subjecting the composition under reduced pressure to the action of heat to about 250° Fahrenheit, at the same time agitating the same, whereby the paraformaldehyde is transformed into gaseous formic aldehyde which becomes absorbed, occluded, or retained within the porous talcum. This heating and agitation is maintained for about four hours, after which the talcum containing the absorbed or occluded formic aldehyde is removed from the apparatus and is in condition for use.

I have found it of great advantage to mix with the powdered talcum prior to subjecting it to the action of formic aldehyde about one-third of its weight of aluminium oxid or alumina. The advantage obtained by mixing the talcum with alumina is twofold, the first of which being that the more porous property of the alumina admits of its more readily taking up the formic aldehyde and occluding the same, and second, that in the finished product the more absorbent property of the alumina assists in producing a dry surface by the absorption of perspiration or moisture when applied to the skin, while its antiseptic formic-aldehyde content destroys the odorous principle thereof, leaving the talcum to perform its usual antichafing function.

In order to mask the slight pungent odor of the composition produced by the absorption or occlusion of formic aldehyde or its polymerids in porous solid substances, I find it of advantage to add to the composition a small portion of some aromatic substance—such, for instance, as powdered orris-root, which contains fragrant ketones, or a weak solution of fragrant ketones, such as ionone (synthetic violet) or other pleasant aromatic substance.

Instead of mixing alumina with powdered talcum I can employ any other absorbent substance—such, for instance, as starch or rice-flour—the object being to combine with the ordinary antichafing substance, such as talcum, a substance capable of absorbing moisture or perspiration and simultaneously producing a dry surface of the skin to which applied without retarding the antichafing action of the talcum or similar antifriction or lubricant substance, the principal object of my invention being to combine as a new antiseptic composition of matter the antiseptic and deodorizing properties of formic aldehyde or its polymerids with an antichafing or lubricant substance and in addition to increase the value thereof as a toilet article by associating it with an absorbent to take up perspiration or moisture and an aromatic substance to mask the formic aldehyde and produce a composition having a pleasant agreeable odor or perfume.

Instead of employing powdered orris-root or ionone (synthetic violet) as an odorizing or perfuming agent I can employ any other aromatic substance without departing from the spirit of my invention. I can also employ as an absorbent constituent in place of alumina, rice-flour, &c., a solid porous substance capable of being decomposed by acids, such as uric acid, in which case the substance can be used to discharge formic aldehyde in urinals and prevent decomposition, thereby preventing disagreeble odors arising therefrom. The substance which I prefer to employ in this case is powdered calcium carbonate or chalk, which is decomposed by the action of urine, evolving the absorbed or occluded formic aldehyde therefrom, and the diffusion thereof is facilitated by the simultaneous evolution of carbonic-acid gas.

The moisture-absorbent substance which I employ in my composition, such as alumina, I prefer to designate as a "bibulous" substance, implying thereby a solid non-deliquescing substance capable of absorbing moisture, and the term "talcum" as employed in the specification and claims is intended to imply an emollient substance which largely consists of magnesium silicate, such as talc.

Having now described my invention, what I claim as new, and desire to secure by Letters Patent, is—

1. A new antiseptic powder comprising powdered talcum and formic aldehyde.

2. A new antiseptic powder comprising powdered talcum, formic aldehyde, and a substance capable of masking the odor of formic aldehyde.

3. A new composition of matter consisting of powdered talcum containing formic aldehyde, a substance capable of masking the odor of the formic aldehyde, and powdered alumina.

4. A new antiseptic powder consisting of powdered talcum containing formic aldehyde, a fragrant ketone, and alumina.

5. The process of making a solid composition containing formic aldehyde, which consists in generating the formic aldehyde in the presence of a porous absorbent substance under subatmospheric pressure.

6. The process of making a solid composition containing formic aldehyde, which consists in exposing a porous mineral substance to reduced pressure and then introducing formic aldehyde into the pores thereof.

7. The process of making a porous composition containing formic aldehyde, which consists in mixing the porous substance with a formic-aldehyde-generating material, exhausting the air therefrom, and exposing the mixture to the action of heat, whereby the formic aldehyde produced is absorbed by the porous substance.

8. The process of making a porous composition containing formic aldehyde, which consists in mixing a porous substance with paraformaldehyde, exhausting the air therefrom, and exposing the mixture to the action of heat.

9. The process of making a porous composition containing formic aldehyde, which consists in mixing powdered talcum with formic aldehyde, exhausting the air therefrom, and exposing the mixture to the action of heat.

In testimony whereof I affix my signature in presence of two witnesses.

HENRY SPENCER BLACKMORE.

Witnesses:
C. C. WRIGHT,
H. N. JENKINS.